(12) United States Patent
Miyachi

(10) Patent No.: US 7,119,866 B2
(45) Date of Patent: Oct. 10, 2006

(54) LIQUID CRYSTAL DISPLAY DEVICE

(75) Inventor: Koichi Miyachi, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 370 days.

(21) Appl. No.: 10/377,655

(22) Filed: Mar. 4, 2003

(65) Prior Publication Data

US 2003/0169389 A1 Sep. 11, 2003

(30) Foreign Application Priority Data

Mar. 8, 2002 (JP) .............................. 2002-064475

(51) Int. Cl.
*G02F 1/13* (2006.01)

(52) U.S. Cl. ..................... 349/117; 349/118; 349/119

(58) Field of Classification Search ............. 349/117, 349/118, 119
See application file for complete search history.

(56) References Cited

U.S. PATENT DOCUMENTS

| 6,281,956 | B1 | 8/2001 | Ohmuro et al. | |
| 6,339,460 | B1 | 1/2002 | Saitoh | |
| 6,512,561 | B1 * | 1/2003 | Terashita et al. | 349/118 |
| 6,642,981 | B1 | 11/2003 | Ohmuro et al. | |
| 6,661,488 | B1 * | 12/2003 | Takeda et al. | 349/117 |

FOREIGN PATENT DOCUMENTS

| JP | 10-123576 | 5/1998 |
| JP | 10-153802 | 6/1998 |

(Continued)

OTHER PUBLICATIONS

U.S. Appl. No. 10/377,660 filed Mar. 4, 2003 entitled "Liquid Crystal Display Device".

(Continued)

*Primary Examiner*—James A. Dudek
(74) *Attorney, Agent, or Firm*—Nixon & Vanderhye, P.C.

(57) ABSTRACT

A positive uniaxial film 14 with a retardation of Rp [nm] in an in-plane direction is provided between a vertical alignment mode liquid crystal cell 11 and a polarizing plate 12, and a negative uniaxial film 15 with a retardation of Rn [nm] in a thickness direction is provided between the liquid crystal cell 11 and a polarizing plate 13. Further, when a parameter $\alpha1$ [nm] relative to Rp is: $\alpha1=135-0.7\times Rtac$; and a parameter $\beta1$ [nm] relative to Rn is: $\beta1=Rlc-6-1.4\times Rtac$, where Rtac [nm] is a retardation in a thickness direction of the respective triacetyl cellulose films 12b and 13b of polarizing plates 12 and 13, the retardation Rp is set to be a value ranging from 80% to 120% of the parameter $\alpha1$, and the retardation Rn is set to be a value ranging from 60% to 90% of the parameter $\beta1$. This makes it possible to surely provide a vertical alignment mode liquid crystal display device which can maintain a contrast with a sufficiently high value in practical use when viewed from an oblique direction and limit the coloring and tone degradation within a tolerance level.

10 Claims, 11 Drawing Sheets

FOREIGN PATENT DOCUMENTS

| | | |
|---|---|---|
| JP | 11-024067 | 1/1999 |
| JP | 11-95208 A | 4/1999 |
| JP | 2947350 B2 | 7/1999 |
| JP | 11-258605 | 9/1999 |
| JP | 11-305217 | 11/1999 |
| JP | 2000-019518 | 1/2000 |
| JP | 2000-039610 | 2/2000 |
| JP | 2000-066196 | 3/2000 |
| JP | 2000-081618 | 3/2000 |
| JP | 2000-121831 | 4/2000 |
| JP | 2000-131693 | 5/2000 |
| JP | 2000-235185 | 8/2000 |
| JP | 2000-284290 | 10/2000 |
| JP | 2000-330111 | 11/2000 |
| JP | 2002-055342 | 2/2002 |
| JP | 2002-116464 | 4/2002 |

OTHER PUBLICATIONS

Japanese Office Action mailed Oct. 18, 2005 (w/English Translation thereof).

* cited by examiner

| THICKNESS OF LIQUID CRYSTAL CELL [μm] | $R_{TAC}$ [nm] | Rp [nm] | Rn [nm] |
|---|---|---|---|
| 3.0 | 0 | 137 | 173 |
| | 30 | 109 | 138 |
| | 50 | 93 | 110 |
| | 80 | 74 | 62 |
| 4.0 | 0 | 137 | 260 |
| | 30 | 109 | 225 |
| | 50 | 93 | 197 |
| | 80 | 74 | 149 |
| 5.0 | 0 | 137 | 348 |
| | 30 | 109 | 313 |
| | 50 | 93 | 284 |
| | 80 | 74 | 236 |

LIQUID CRYSTAL DISPLAY DEVICE

FIELD OF THE INVENTION

The present invention relates to a vertical alignment mode liquid crystal display device.

BACKGROUND OF THE INVENTION

Conventionally, a liquid crystal display device has been widely used for the screen of a word processor and computer. In recent years, the liquid crystal display device has spread rapidly as a television screen. Many of these liquid crystal display devices adopt TN (Twisted Nematic) mode. However, the TN mode liquid crystal display device has the problems of tendencies to degrade a contrast and to reverse a gradation property when viewed from an oblique direction.

For this reason, in recent years, in light of the improvement in viewing angle property, a VA (Vertical Alignment) mode liquid crystal display device has been attracting attention. A liquid crystal cell of the VA mode liquid crystal display device is arranged in combination of a nematic liquid crystal having a negative dielectric ansiotropy with a vertical alignment film.

Further, for example, Japanese Patent No. 2947350 (granted on Jul. 2, 1999), as shown in FIG. 13, discloses a liquid crystal display device 101 in which a positive uniaxial film 114 and a negative uniaxial film 115 are provided between a liquid crystal cell 111 and a polarizing plate 112 and between the liquid crystal cell 111 and a polarizing plate 113, respectively, in order to compensate the optical anisotropy of the liquid crystal cell 111 when black image is displayed.

With the above arrangement, even though the liquid crystal cell 111 brings a phase difference depending on a polar angle to transmitting light when the liquid crystal cell 111 in which liquid crystal molecules are oriented vertically is viewed from an oblique direction, properly setting the respective retardations of the films 114 and 115 can compensate the phase difference. Therefore, black displaying can be performed substantially as in the case when the liquid crystal cell 111 is viewed from a front direction, that is, as in the case where the liquid crystal molecules maintain the polarizing state of the transmitting light. As a result of this, it is possible to prevent light leakage, thus enhancing the contrast and suppressing the occurrence of coloring and tone degradation when viewed from an oblique direction.

However, under the situation where a liquid crystal display device with a wider viewing angle and higher display quality is expected, there is a demand for the improvement in coloring and tone degradation caused when viewed from the oblique direction nowadays. The liquid crystal display device using the films 114 and 115 with the retardation described in Japanese Patent No. 2947350, however, is not always satisfactory and still leaves room for improvement.

SUMMARY OF THE INVENTION

In a vertical alignment mode liquid crystal display device, the present invention has been attained as a result of the consideration of the influence that base films of polarizing plates have on the retardations of films which are suitable for the suppression of coloring and tone degradation when viewed from an oblique direction. An object of the present invention is to surely provide a liquid crystal display device which can limit the coloring and tone degradation within a tolerance level in practical use, maintaining a contrast with a sufficiently high value in practical use when viewed from an oblique direction.

A liquid crystal display device according to the present invention, in order to attain the above object, includes:

a liquid crystal cell which is provided with two substrates to sandwich a liquid crystal and to cause liquid crystal molecules in the liquid crystal to orient substantially vertically to surfaces of the two substrates;

first and second polarizing plates which are provided on two sides of the liquid crystal cell, respectively, so that absorption axes of the polarizing plates are orthogonal to each other;

a first phase difference film, provided between the first polarizing plate and the liquid crystal cell, having a positive uniaxial anisotropy; and a second phase difference film, provided between the second polarizing plate and the liquid crystal cell, having a negative uniaxial anisotropy, the first and second polarizing plates being provided with respective base films, which are provided so that optical axes of the base films are substantially vertical to the substrates, each of the base films having a negative uniaxial anisotropy, the first phase difference film being provided so that a retardation axis of the first phase difference film is orthogonal to the absorption axis of the first polarizing plate, the second phase difference film being provided so that an optical axis of the second phase difference film is substantially vertical to the substrates, taking the following means.

More specifically, when a parameter α [nm] relative to Rp is:

$\alpha = 135 - 0.7 \times Rtac$; and a parameter β [nm] relative to Rn is:

$\beta = Rlc - 65 - 1.4 \times Rtac$, where Rp [nm] is a retardation in an in-plane direction of the first phase difference film, Rn [nm] is a retardation in a thickness direction of the second phase difference film, Rtac [nm] is a retardation in a thickness direction of the base films, and Rlc [nm] is a retardation in a thickness direction of the liquid crystal, the retardation Rp is set to be not less than 80% nor more than 120% of the parameter α, and the retardation Rn is set to be not less than 60% nor more than 90% of the parameter β.

Further, the second phase difference film, instead of being disposed on the opposite side to the first phase difference film viewed from the liquid crystal, may be disposed on the same side of the first phase difference film as well as between the first phase difference film and the polarizing plate.

In the liquid crystal display device of the foregoing arrangements, liquid crystal molecules oriented substantially vertically to the substrates, although not bringing a phase difference to light incident from the normal direction to the substrate, bring a phase difference depending on a polar angle (tilt angle to the normal direction) to obliquely incident light. Therefore, the liquid crystal display device cannot completely absorb the light supposed to be absorbed by the polarizing plate on the side from where the light emits, without the first and second phase difference films. This results in the occurrence of light leakage, thus degrading a contrast and causing the coloring and tone degradation.

In order to solve the problem, since the above arrangement is provided with first and second phase difference films, the phase difference that the liquid crystal has brought depending on the polar angle can be compensated by the first and second phase difference films. As a result of this, it is possible to prevent light leakage when viewed from an oblique direction, enhancing the contrast and preventing the occurrence of coloring and tone degradation.

Here, when the respective retardations of the first and second phase difference films are determined, it cannot be always said that just subtracting the retardation in the thickness direction of the base films from each of the respective retardations in the thickness direction of the first and second phase difference films, which is an optimum retardation when base films are absent, is a sufficient compensation, because the coloring and tone degradation caused when viewed from an oblique direction are required to be suppressed much further.

The inventors of the present application, as a result of extensive research to further suppress the coloring and tone degradation, maintaining a contrast with a sufficiently high value in practical use when a vertical alignment mode liquid crystal display device is viewed from an oblique direction, have found that the retardation in the thickness direction of the base films does not always function as equally as each of the retardation in the thickness direction of the first phase difference film and the retardation in the thickness direction of the second phase difference film. Specifically, the inventors have found to complete the present invention that: when the retardation in the in-plane direction of the first phase difference film with a positive uniaxial anisotropy is set so that the contrast becomes the maximum, the retardation does not depend on the retardation of the liquid crystal, but on the retardation in the thickness direction of the base films; and it is possible to effectively suppress the coloring and tone degradation by setting the retardations to be in a predetermined area with reference to such retardations that the contrast becomes the maximum.

In the liquid crystal display device of the present invention, the retardation Rp in the in-plane direction of the first phase difference film is set according to the retardation Rtac in the thickness direction of the base films; the retardation Rn in the thickness direction of the second phase difference film is set according to the retardation Rlc in the thickness direction of the liquid crystal and the retardation Rtac in the thickness direction of the base films; and the retardations Rp and Rn are set to be in the area where the coloring and tone degradation can be tolerated, maintaining a contrast with a sufficiently high value in practical use when viewed from an oblique direction. With this arrangement, unlike the arrangement in which the retardation in the thickness direction of the base films is treated equally to the retardation in the thickness direction of the first phase difference film and the retardation in the thickness direction of the second phase difference film, it is possible to surely obtain a liquid crystal display device which can maintain a contrast with a sufficiently high value in practical use when viewed from the oblique direction and limit the coloring and tone degradation within a tolerance level.

Further, since the area of the retardation Rp in the in-plane direction of the first phase difference film does not depend on the retardation Rlc in the thickness direction of the liquid crystal, the area of the retardation Rp does not change even in the case of the use with another liquid crystal having different thickness. Therefore, it is possible to use the base films and the first phase difference film in common between liquid crystals having mutually different retardations Rlc in the thickness direction, leading to better productivity.

In the case where the coloring and tone degradation is especially required to be suppressed, it is desirable that the retardation Rp is set to be not less than 90% nor more than 110% of the parameter α, and the retardation Rn is set to be not less than 65% nor more than 85% of the parameter β, in addition to the above arrangements. With this arrangement, it is possible to obtain a liquid crystal display device which can further suppress the coloring and tone degradation when viewed from an oblique direction.

Furthermore, in the liquid crystal display device according to the present invention, in addition to the above arrangements, it is desirable that the liquid crystal has a negative dielectric anisotropy. According to this arrangement, liquid crystal molecules oriented in the normal direction to the substrate can be tilted depending on electric intensity by applying an electric field substantially in the vertical direction to the substrate. This can simplify the structure of electrodes, as compared with the case of using a liquid crystal having a positive dielectric anisotropy.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 12, the following will explain one embodiment of the present invention. Note that, as described in detail later, the present invention can be applied to other liquid crystal cell; however, the following will explain a multi-domain vertical alignment liquid crystal cell as one preferable example of a liquid crystal cell.

Figure 1:
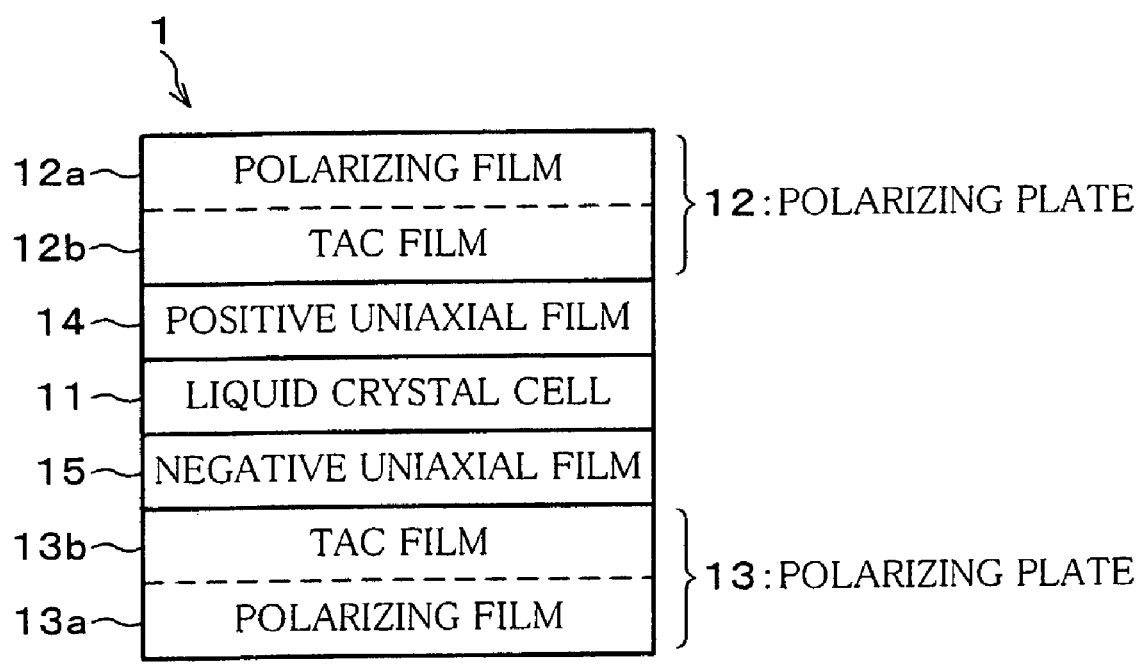
FIG. 1 is a schematic diagram showing the main arrangement of a liquid crystal display device according to an embodiment of the present invention.

A liquid crystal display device 1 according to the present embodiment is, as shown in FIG. 1, has a layer structure, including a vertical alignment (VA) mode liquid crystal cell 11, polarizing plates 12 and 13 which are respectively disposed on the two sides of the liquid crystal cell 11, a positive uniaxial film (first phase difference film) 14 which is disposed between the polarizing plate 12 and the liquid crystal cell 11, and a negative uniaxial film (second phase difference film) 15 which is disposed between the polarizing plate 13 and the liquid crystal cell 11.

Figure 2:
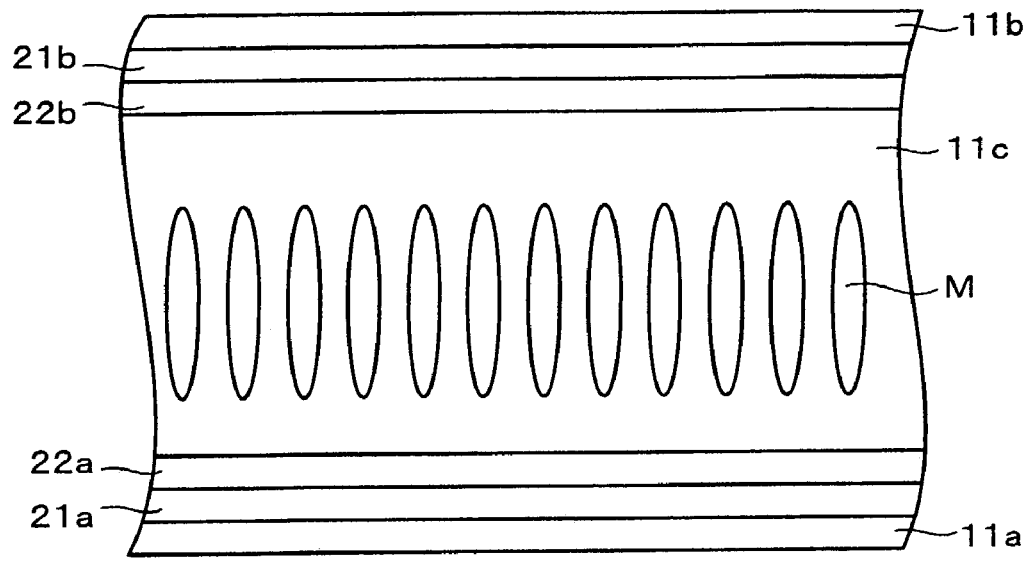
FIG. 2 is a schematic diagram showing a liquid crystal cell provided in the liquid crystal display device in the state where no voltage is applied.

The liquid crystal cell 11, as shown in FIG. 2, includes: a TFT (Thin Film Transistor) substrate 11a provided with a pixel electrode 21a corresponding to a pixel (described later); a counter substrate 11b provided with a counter electrode 21b; and a liquid crystal layer (liquid crystal) 11c, sandwiched between the substrates 11a and 11b, which is a nematic liquid crystal with negative dielectric anisotropy. Note that, the liquid crystal display device 1 according to the present embodiment is capable of color display, and a color filter including the colors of pixels is formed on the counter substrate 11b.

Further, under the TFT substrate 11a provided with the pixel electrode 21a, a vertical alignment film 22a is formed on one side surface of the liquid crystal layer 11c. Similarly, under the counter substrate 11b provided with the counter electrode 21b, a vertical alignment film 22b is formed on the other side surface of the liquid crystal layer 11c. With this arrangement, in the state where a voltage is not applied between the two electrodes 21a and 21b, liquid crystal molecules M in the liquid crystal layer 11c, which is disposed between the two substrates 11a and 11b, are oriented vertically to the surfaces of the substrates 11a and 11b. On the other hand, when a voltage is applied between the two electrodes 21a and 21b, the liquid crystal molecules M in the state of being oriented in the normal direction to the substrates 11a and 11b (in the state where no voltage is applied) tilt at a tilt angle depending on the applied voltage (see FIG. 3). Note that, the two substrates 11a and 11b are opposed to each other, so that the normal direction and in-plane direction with respect to the substrates 11a and 11b are hereinafter referred to just as normal direction and in-plane direction, except for the case where they are required to be distinguished.

Here, the liquid crystal cell 11 according to the present embodiment is a multi-domain vertical alignment liquid crystal cell in which each pixel is divided into a plurality of regions (domains), and is controlled so that the domains have mutually different orientation directions, i.e. azimuths of the liquid crystal molecules M tilted when a voltage is applied (in-plane components at a tilt angle).

Figure 4:
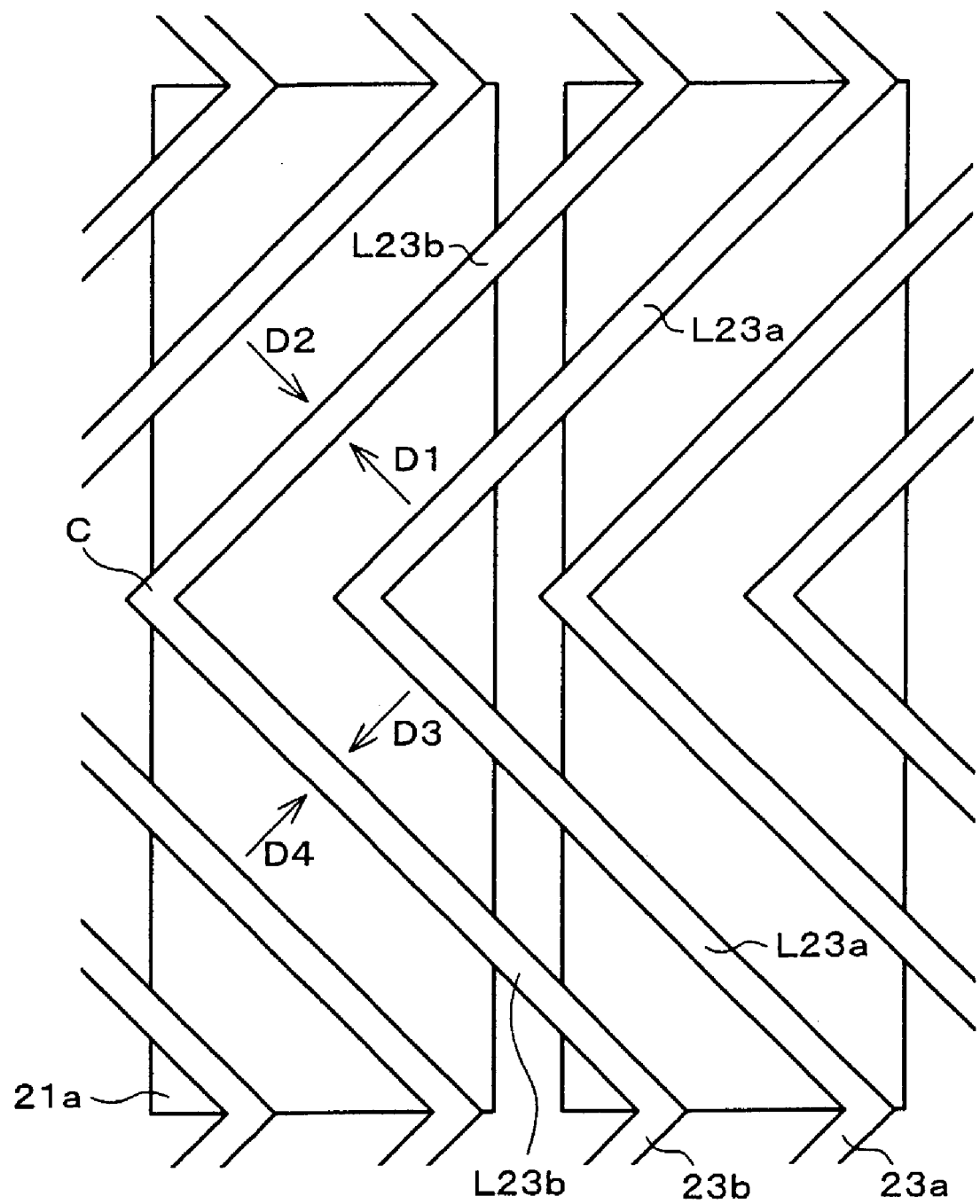
FIG. 4 is a plan view showing the vicinity of a pixel electrode in an arrangement example of the liquid crystal cell.

More specifically, as shown in FIG. 4, the pixel electrode 21a has protrusions 23a formed thereon in a stripe pattern, and each of the protrusions 23a zigzags appropriately at right angles in the in-plane direction with a mountain shape in cross-section. Similarly, the counter electrode 21b has protrusions 23b formed thereon in a stripe pattern, and each of the protrusions 23b zigzags appropriately at right angles in the in-plane direction with a mountain shape in the normal direction. The two protrusions 23a and 23b in the in-plane direction are disposed at such a distance that the normal to the slope of the protrusion 23a is substantially equal to the normal to the slope of the protrusion 23b. Further, the protrusions 23a and 23b are formed by the application of a photosensitive resin on the pixel electrode 21a and the counter electrode 21b, respectively, and the process of photolithography.

Here, the liquid crystal molecules near the protrusions 23a are oriented so as to be vertical to the slopes of the protrusions 23. In addition, when a voltage is applied, the electric field near the protrusions 23a tilts so as to be parallel to the slopes of the protrusions 23a. Here, the long axes of the liquid crystal molecules tilt in the vertical direction with respect to the electric field. According to the continuity of liquid crystal, the liquid crystal molecules away from the slopes of the protrusions 23a are oriented as well in the same direction as the direction in which the liquid crystal molecules near the slopes of the protrusions 23a tilt. Similarly, when a voltage is applied, the electric field near the protrusions 23b tilts so as to be parallel to the slopes of the protrusions 23b. Here, the long axes of the liquid crystal molecules tilt in the vertical direction with respect to the electric field. According to the continuity of liquid crystal, the liquid crystal molecules away from the slopes of the protrusions 23b are oriented as well in the same direction as the direction in which the liquid crystal molecules near the slopes of the protrusions 23b tilt.

Consequently, as to the protrusions 23a and 23b, when parts except for a corner part C are referred to as line parts, in the region between a line part L23a of the protrusion 23a and a line part L23b of the protrusion 23b, in-plane component as the orientation direction of the liquid crystal molecules when a voltage is applied is equal to that in the direction from the line part L23a to the line part L23b.

Here, in the protrusions 23a and 23b, the corner part C bends approximately at right angles. Therefore, the orientation direction of the liquid crystal molecules is divided into four parts in a pixel, and this can form domains D1 to D4 of mutually different orientation directions of the liquid crystal molecules in the pixel.

On the other hand, the polarizing plates 12 and 13 shown in FIG. 1 are respectively provided with polarizing films 12a and 13a and triacetyl cellulose (TAC) films 12b and 13b as base films for holding the polarizing films 12a and 13a. The two TAC films 12b and 13b have negative optically uniaxial anisotropy, and the respective optical axes are set so as to be substantially equal to the normal direction of the liquid crystal cell 11. The two polarizing plates 12 and 13 are disposed so that an absorption axis AA12 of the polarizing plate 12 is orthogonal to an absorption axis AA13 of the polarizing plate 13. Further, the two polarizing plates 12 and 13 are disposed so that each of the absorption axes AA12 and AA13 forms an angle of 45 degrees with the in-plane component in the orientation direction of the liquid crystal molecules in each of the domains D1 to D4 when a voltage is applied.

Further, the positive uniaxial film 14, which is layered on one surface of the liquid crystal cell 11, is an optically anisotropic film having the property of nxp>nyp=nzp, where nxp and nyp are refractive indexes in the in-plane direction of the film, and nzp is a refractive index in the normal direction. Let a film thickness be dp, retardation Rp in the in-plane direction can be calculated by the following expression (1):

$$Rp = dp \cdot (nxp - nyp) \quad (1).$$

Further, the positive uniaxial film 14 is disposed so that its retardation axis SL14 is orthogonal to the absorption axis AA12 of the polarizing plate 12 at the same side when viewed from the liquid crystal cell 11.

Meanwhile, the negative uniaxial film 15, which is layered on the other surface of the liquid crystal cell 11, is an optically anisotropic film having the property of nxn=nyn>nzn, where nxn and nyn are refractive indexes in the in-plane direction of the film, and nzn is a refractive index in the normal direction. Let a film thickness be dn, retardation Rn in the thickness direction can be calculated by the following expression (2):

$$Rn = dn \cdot \{(nxn+nyn)/2 - nzn\} \quad (2).$$

Further, the negative uniaxial film 15 is disposed so that its optical axis is substantially equal to the normal direction of the liquid crystal cell 11.

Figure 3:
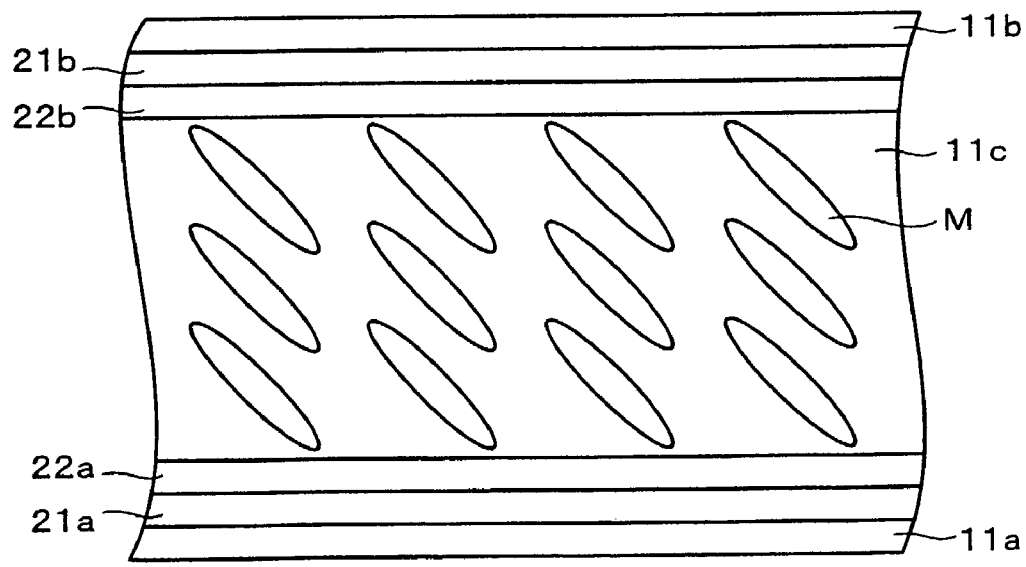
FIG. 3 is a schematic diagram showing a liquid crystal cell provided in the liquid crystal display device in the state where a voltage is applied.

With the above-arranged liquid crystal display device 1, while a voltage is applied between the pixel electrode 21$a$ and the counter electrode 21$b$, the liquid crystal molecules in the liquid crystal cell 11, as shown in FIG. 3, are obliquely oriented to the normal direction just at the angle depending on the applied voltage. This brings a phase difference depending on the applied voltage to light passing through the liquid crystal cell 11.

Here, the absorption axes AA12 and AA13 of the polarizing plates 12 and 13 are disposed so as to be orthogonal to each other. As described in detail later, the positive uniaxial film 14 and negative uniaxial film 15 are arranged so as to compensate the phase difference that the liquid crystal cell 11 brings to transmitting light in the case where the liquid crystal molecules in the liquid crystal cell 11 are oriented in the normal direction, as shown in FIG. 2.

Therefore, light incident to a polarizing plate on the side from where the light emits (e.g. the polarizing plate 12) turns elliptically polarized light depending on the phase difference that the liquid crystal cell 11 brings, and a part of the incident light passes through the polarizing plate 12. As a result of this, the amount of light emitted from the polarizing plate 12 can be controlled in accordance with the applied voltage. This makes it possible to display with gradations.

Further, the liquid crystal cell 11 has domains D1 to D4 formed of mutually different orientation directions of the liquid crystal molecules in a pixel. Therefore, even in the case where the liquid crystal molecules cannot bring phase difference to transmitting light when the liquid crystal cell 11 is viewed from the direction which is parallel to the orientation direction of liquid crystal molecules which belong to a certain domain (e.g. the domain D1), the liquid crystal molecules in the rest of domains (the domains D2 to D4 in this case) can bring phase difference to transmitting light. Thus, the domains can optically compensate with one another. As a result of this, it is possible to improve a display quality level of the liquid crystal cell 11 and to increase a viewing angle when viewed from an oblique direction.

On the other hand, while a voltage is not applied between the pixel electrode 21$a$ and the counter electrode 21$b$, the liquid crystal molecules in the liquid crystal cell 11, as shown in FIG. 2, are in the state of being oriented vertically. In this state (when no voltage is applied), the light incident from the normal direction to the liquid crystal cell 11, which cannot be brought phase difference by the liquid crystal molecules, passes through the liquid crystal cell 11, maintaining a polarized state. As a result of this, light incident to a polarizing plate on the side from where the light emits (e.g. the polarizing plate 12) turns linearly polarized light which is substantially parallel to the absorption axis AA12 of the polarizing plate 12 and cannot pass through the polarizing plate 12. This allows the liquid crystal display device 1 to display black image.

Here, to the light incident from an oblique direction to the liquid crystal cell 11, brought by liquid crystal molecules is the phase difference depending on the angle between the incident light and the orientation direction of the liquid crystal molecules, that is, the angle (polar angle) between the incident light and the normal direction to the liquid crystal cell 11. Therefore, without the positive uniaxial film 14 and the negative uniaxial film 15, the light incident to the polarizing plate 12 turns elliptically polarized light depending on the polar angle, and a part of the polarized light passes through the polarizing plate 12. This results in the occurrence of light leakage even in the state where the liquid crystal molecules are oriented vertically to display black image, which may degrade displaying contrast and cause the coloring and tone degradation.

However, with the arrangement shown in FIG. 1 in which the positive uniaxial film 14 and the negative uniaxial film 15 are provided, if the respective retardations are properly set, the phase difference brought depending on the polar angle by the liquid crystal cell 11 can be cancelled. As a result of this, it is possible to prevent light leakage, thus enhancing the contrast and suppressing the occurrence of coloring and tone degradation when viewed from an oblique direction.

Here, in the liquid crystal display device 1 according to the present embodiment, the respective retardations of the positive uniaxial film 14 and the negative uniaxial film 15 are set as described below, in order to attain a liquid crystal display device which characterizes excellent color and gradation, maintaining a sufficiently high contrast in practical use, as a display quality level when viewed obliquely; more specifically, in order to attain a liquid crystal display device such that a viewer hardly perceives the coloring and tone degradation when viewing from an oblique direction, keeping the contrast of a sufficiently high value of 10 or more in practical use when viewed from an oblique direction.

Specifically, when retardation Rtac [nm] in the thickness direction of the TAC films 12$b$ and 13$b$ and a parameter α1 [nm] relative to the retardation Rp are expressed by the following expression (3):

$$\alpha 1 = 135 - 0.7 \times Rtac \quad (3),$$

the retardation Rp in the in-plane direction of the positive uniaxial film 14 is set to be not less than 80% nor more than 120% of the parameter β1.

Further, when retardation Rlc [nm] in the thickness direction of the liquid crystal cell 11 and a parameter β1 [nm] relative to the retardation Rn are expressed by the following expression (4):

$$\beta 1 = Rlc - 65 - 1.4 \times Rtac \quad (4),$$

the retardation Rn in the thickness direction of the negative uniaxial film 15 is set to be not less than 60% nor more than 90% of the parameter β1.

Figure 5:
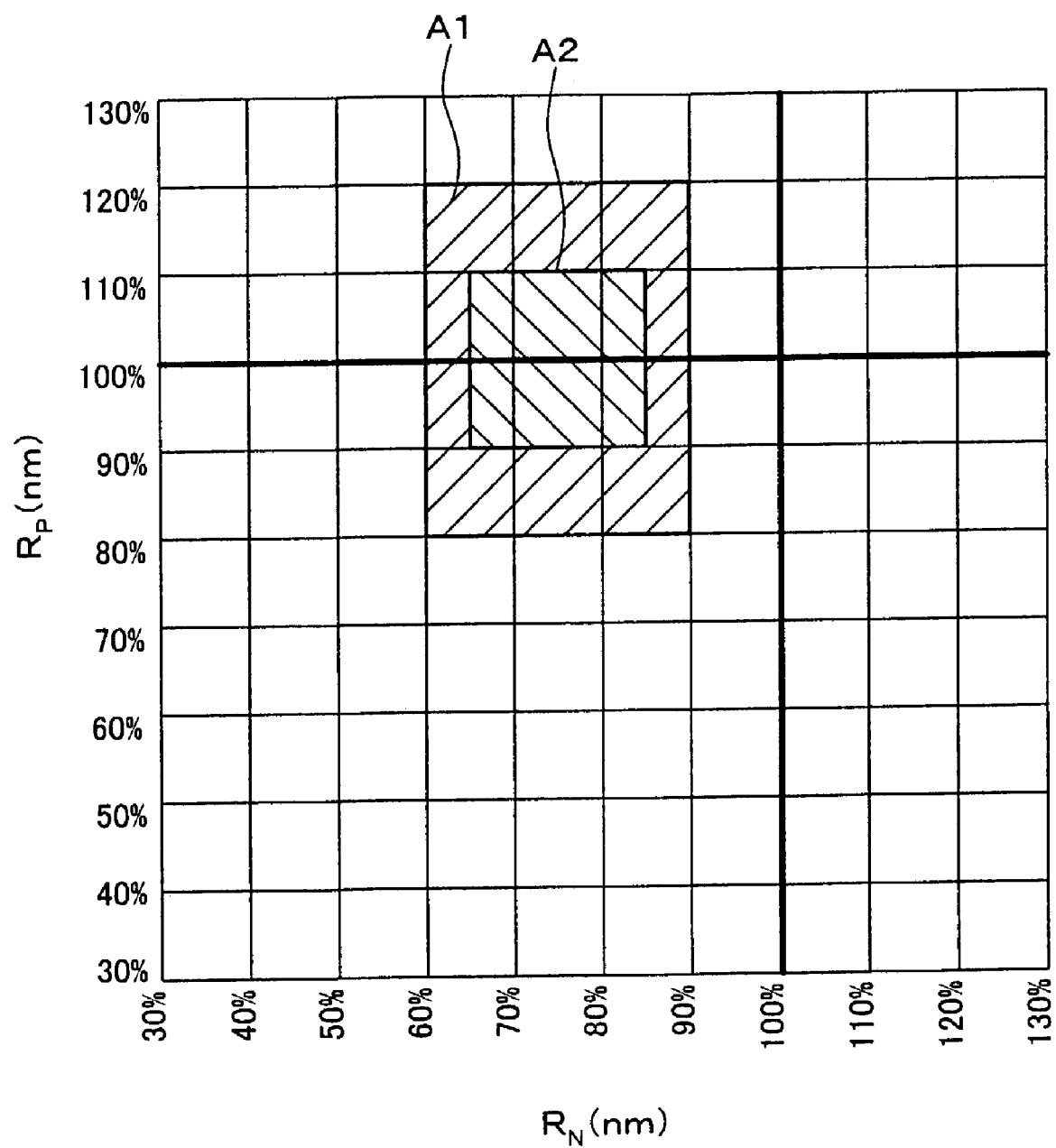
FIG. 5 shows preferable areas for retardation in the in-plane direction of a positive uniaxial film and retardation in the thickness direction of a negative uniaxial film which are provided in the liquid crystal display device, where the retardations are expressed by relative values to the respective parameters.

Thus, by setting the retardations Rp and Rn to be in an area A1 shown in FIG. 5 with reference to the parameters α1 and β1, it is possible to surely attain the liquid crystal display device 1 with such an excellent viewing angle property that a viewer hardly perceives the coloring and tone degradation when viewing from an oblique direction, maintaining the contrast of a sufficiently high value of 10 or more in practical use when viewed from an oblique direction.

Further, less coloring and tone degradation found by the viewer occur in the inner part than in the peripheral part of the area A1. Especially, as in an area A2 shown in FIG. 5, by setting the retardation Rp to be not less than 90% nor more than 110% of the parameter α1 as well as by setting the retardation Rn to be not less than 65% nor more than 85% of the parameter β1, it is possible to realize the liquid crystal display device 1 with more excellent viewing angle property.

Note that, when the retardations Rp and Rn are set to be in the area A2, the improvement in the coloring and tone degradation more than that obtained when those are set to be in the area A1 is not recognized by the viewer, and the improvement in the coloring and tone degradation is substantially saturated. Therefore, by setting the retardations Rp and Rn to be in the area A2, it is possible to realize the liquid crystal display device 1 with such an excellent displaying quality level. Further, when the retardations Rp and Rn are respectively set to the same values of the parameters α1 and β1, the contrast when viewed from an oblique direction becomes the maximum. Still further, the retardations Rp and Rn respectively set to the values ranging from 80% to 120% of the parameter α1 and 85% to 90% of the parameter β1 can limit the occurrence of the coloring and tone degradation within a tolerance level as well as enhance the contrast, as compared with the case where the retardations Rp and Rn are set to be in the area A2.

Figures 6, 7:
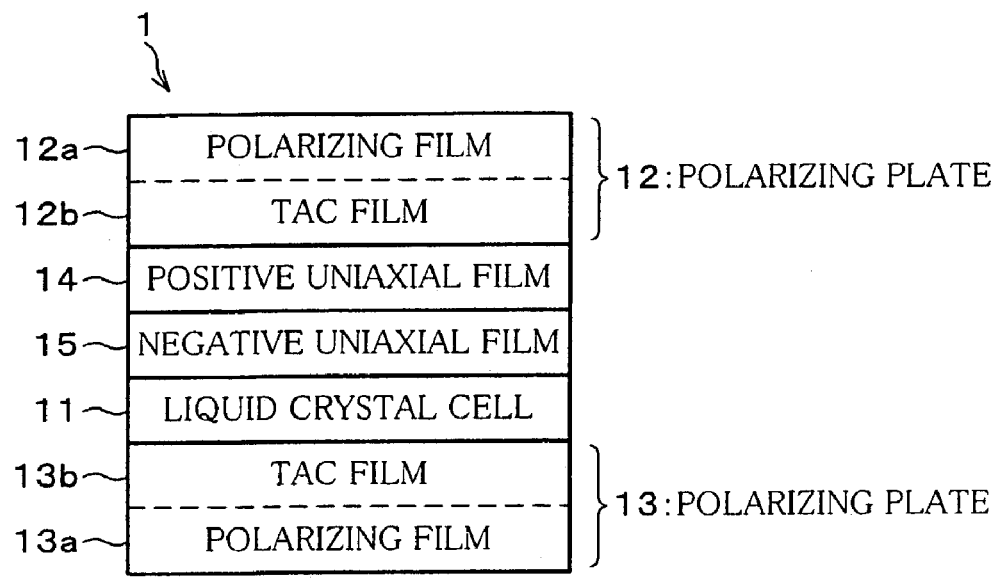
FIG. 6 is a schematic diagram showing the main arrangement of a liquid crystal display device which is a variant example of the liquid crystal display device shown in FIG. 1.
FIG. 7 shows experimental results of optimal values for the retardations with respect to the combination of a liquid crystal cell with a polarizing plate in an example of the present invention.

Further, a liquid crystal display device 1a shown in FIG. 6, which differs from the liquid crystal display device 1 shown in FIG. 1 in that the negative uniaxial film 15 is layered between the positive uniaxial film 14 and the liquid crystal cell 11, can obtain the same effect as well.

Here, as apparent from the expression (3) and FIG. 7 described later, the retardation Rp of the positive uniaxial film 15 does not depend on a cell thickness dlc of the liquid crystal cell 11, i.e. the retardation Rlc in the thickness direction of the liquid crystal cell 11, but only on the retardation Rtac in the thickness direction of the TAC films 12b and 13b.

Therefore, even in the case where the positive uniaxial film 15 is used together with the liquid crystal cell 11 of a different thickness, there are no changes in optimal values of the positive uniaxial film 14 and TAC films 12b and 13b. As a result of this, in the liquid crystal display device 1 (1a) in which the liquid crystal cell 11, polarizing plates 12 and 13, the positive uniaxial film 14, and the negative uniaxial film 15 are layered in the order shown FIG. 1 or FIG. 6, the positive uniaxial film 14 and TAC films 12b and 13b can be used in common between mutually different liquid crystal cells 11. Note that, even in this case, the negative uniaxial film 15 is selected in accordance with the liquid crystal cell 11.

EXAMPLE 1

In the present example, as the liquid crystal cell 11 prepared were liquid crystal cells with a refractive index anisotropy Δn of 0.08 each in the liquid crystal layer 11c, and respective thicknesses (cell thickness dlc) of 3.0 [μm], 4.0 [μm], and 5.0 [μm], i.e. liquid crystal cells with respective retardations Rlc (=dlc·Δn) in the thickness direction of 240 [nm], 320 [nm], and 400 [nm]. Also, as TAC films 12b and 13b prepared were TAC films with respective retardations Rtac in the thickness direction of 0 [nm], 30 [nm], 50 [nm], and 80 [nm]. Further, for all combinations of the liquid crystal cells 11 with the TAC films 12b and 13b calculated were the respective retardations Rp and Rn where the contrast when viewed from an oblique direction became the maximum. As a result of this, the experimental result shown in FIG. 7 could be obtained.

Figure 8:
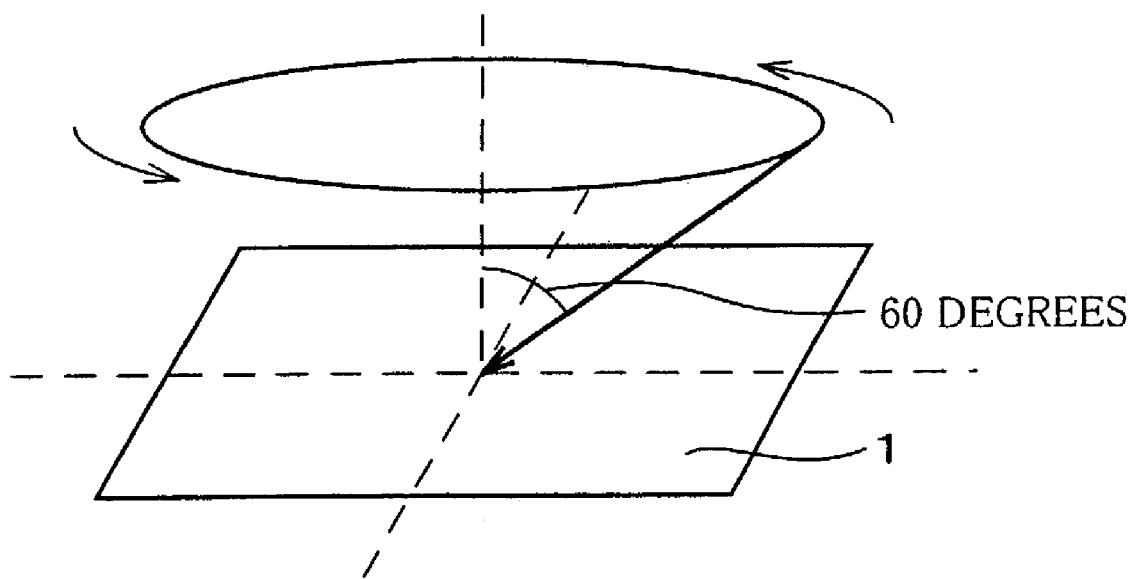
FIG. 8 shows a contrast evaluation method in a liquid crystal display device.

Note that, a viewing angle in the case where the liquid crystal device 1 is actually used is an angle (polar angle) from the normal to the liquid crystal cell 11 in the range from 0 degree to 60 degrees. Because the increase of the polar angle degrades the contrast, the contrast was measured from the direction in which the polar angle is 60 degrees, as shown in FIG. 8. Further, the contrast was measured at an azimuth (in-plane direction) of 45 degrees with reference to the absorption axes AA12 and AA13 of the polarizing films 12a and 13a because the contrast becomes the minimum at the azimuth of 45 degrees with reference to the absorption axes AA12 and AA13.

According to this, it is confirmed that the liquid crystal display device 1 with the maximum contrast could be obtained under the condition that the retardation Rp in the in-plane direction of the positive uniaxial film 14 was equal to the foregoing parameter α1, and the retardation Rn in the thickness direction of the negative uniaxial film 15 was equal to the foregoing parameter β1. Further, by approximating the experimental result with a linear expression, the foregoing expressions (3) and (4) could be calculated.

With changes in the retardations Rp and Rn by 5% each at a time, a viewer from the oblique direction estimated the coloring and tone degradation caused in each of the liquid crystal display devices 1. Specifically, the viewer from the oblique direction judged, as the presence or absence of a coloring phenomenon, whether there occurred the phenomenon that white shifted to yellow or a bluish color, and judged, as the presence or absence of tone degradation, whether there occurred the phenomenon that tone degradation in bright regions deteriorated the expressiveness of images.

According to this judgment, it was confirmed that even in the case where the retardation Rlc in the thickness direction of the liquid crystal cell 11 and the retardation Rtac of the TAC films 12b and 13b had any of the foregoing values, the contrast from the oblique direction (at the polar angle of 60 degrees) was above 10, maintaining a sufficient contrast in practical use, under the condition that the retardation Rp was a value of not less than 80% nor more than 120% of the parameter α1, and the retardation Rn was a value not less than 60% nor more than 90% of the parameter β1. Further, it was confirmed that when the retardations Rp and Rn were set to the foregoing ranges, the liquid crystal display device 1 indicated such an excellent viewing angle property that the viewer hardly perceived the coloring and tone degradation when viewing from the oblique direction. Further, in the case where the retardation Rp was smaller than 80% or greater than 120% of the parameter α1, and in the case where the retardation Rn was smaller than 60% or greater than 90% of the parameter β1, it was clearly confirmed by the viewer from the oblique direction that there occurred the coloring phenomenon that white shifted to yellow or a bluish color, or the phenomenon that tone degradation in bright regions deteriorated the expressiveness of images, and it was confirmed as well that the coloring and tone degradation was not tolerable for the viewer.

In addition, it was confirmed that even in the case where the retardation Rlc in the thickness direction of the liquid crystal cell 11 and the retardation Rtac of the TAC films 12b and 13b had any of the foregoing values, less coloring and tone degradation was found by the viewer from the oblique direction under the condition that the retardation Rp was a value not less than 90% nor more than 110% of the parameter α1 and the retardation Rn was a value not less than 65% nor more than 85% of the parameter β1 than the condition that the retardation Rp was a value ranging from 80% to 90% or from 110% to 120% of the parameter α1 and the retardation Rn was a value ranging from 60% to 65% or from 85% to 90% of the parameter β1.

Under the condition that the retardation Rp was a value not less than 90% not more than 110% of the parameter α1 and the retardation Rn was a value not less than 65% nor more than 85% of the parameter β1, it was confirmed that the effect of the improvement in the coloring and tone degradation was substantially saturated, and a plurality of liquid crystal display devices 1 with the respective Rp and Rn set to the above range could obtain similarly excellent display quality level so that the viewer from the oblique direction could not recognize the differences in the coloring and tone degradation from the liquid crystal display devices 1.

Note that, it was confirmed that the center value of the retardation Rp in the area A2 was a value of 100% of the retardation Rp that maximized the contrast from the oblique direction (=the parameter α1) (a value equal to the parameter α1). Meanwhile, it was also confirmed that the center value of the retardation Rn in the area A2 was 75% of the retardation Rn that maximized the contrast from the oblique direction (=the parameter β1), and the coloring phenomenon and the tone degradation could be improved under the condition that the retardation Rn in the thickness direction of the negative uniaxial film 15 was set to be a value smaller than the parameter β1 where the contrast became the optimal.

Further, it was confirmed that the condition that the retardation Rp was set to be in the range from 80% to 120% of the parameter α1, and the retardation Rn was set to be in the range from 85% to 90% of the parameter β1 could limit the coloring and tone degradation within a tolerance level as well as enhance the contrast, as compared with the condition set to be in the area A2.

Further, also in a liquid crystal display device, as the liquid crystal display device 1a shown in FIG. 6, which differed from the liquid crystal display device 1 shown in FIG. 1 in that the negative uniaxial film 15 was layered between the positive uniaxial film 14 and the liquid crystal cell 11, it was confirmed that the retardations Rp and Rn for obtaining the maximum contrast at the oblique viewing angle (at the polar angle of 60 degrees) were the same as those of the liquid crystal display device 1 shown in FIG. 1 even if the retardations Rlc and Rtac were any of the foregoing values, and it was also confirmed that the liquid crystal display device 1a could obtain the same effect by setting the retardations Rp and Rn to be in the same area as that of the liquid crystal display device 1.

Note that, explained in the above description is the case where the orientation direction of the liquid crystal molecules in the pixel is divided into four directions in the liquid crystal cell 11 arranged as shown in FIGS. 2 though 4. However, the present invention is not limited to this. For example, other structures, such as structures shown in FIGS. 9 and 10, in which the orientation direction is divided into four directions, can also obtain the same effect.

Figure 9:
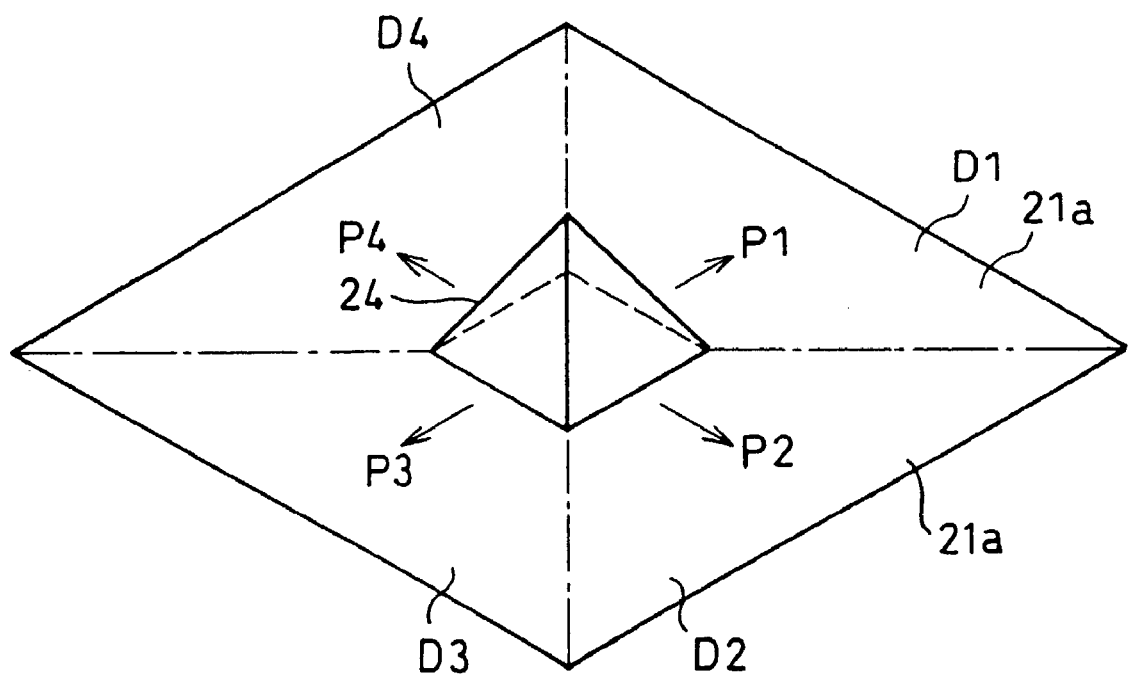
FIG. 9 is a perspective view showing a pixel electrode of a liquid crystal cell in another arrangement example of the foregoing liquid crystal display devices.

More specifically, a liquid crystal cell using a pixel electrode 21a shown in FIG. 9 is provided with a quadrangular pyramid-shaped protrusion 24 formed on the pixel electrode 21a, instead of the protrusions 23a and 23b shown in FIG. 4. Note that, the protrusion 24, as the protrusions 23a, can be formed by the application of a photosensitive resin on the pixel electrode 21a and the process of photolithography.

Also in this arrangement, the liquid crystal molecules near the protrusion 24 are oriented so as to be vertical to each of the slopes. In addition, when a voltage is applied, the electric filed in the part of the protrusion 24 tilts in the parallel direction to the slope of the protrusion 24. As a result of these, when a voltage is applied, the in-plane component of the orientation angle in the liquid crystal molecules is equal to the in-plane component in the normal direction to the slope that is the nearest to the liquid crystal molecules (directions P1, P2, P3 or P4). Therefore, the pixel region is divided into four domains D1 to D4 of mutually different orientation directions when the liquid crystal molecules tilt. As a result of this, it is possible to obtain the same effect as that of the liquid crystal cell 11 with the structure shown in FIGS. 2 through 4.

Note that, in the case where a large-size liquid crystal television such as a 40-inch liquid crystal television, for example, is manufactured, the size of each pixel becomes as large as 1 mm square, and one protrusion 24 alone provided each on the pixel electrode 21a produces week orientation control force, which may cause an unstable orientation. Thus, as in this case, in the case where orientation control force is insufficient, it is desirable that a plurality of protrusions 24 are provided on each of the pixel electrode 21a.

Figure 10:
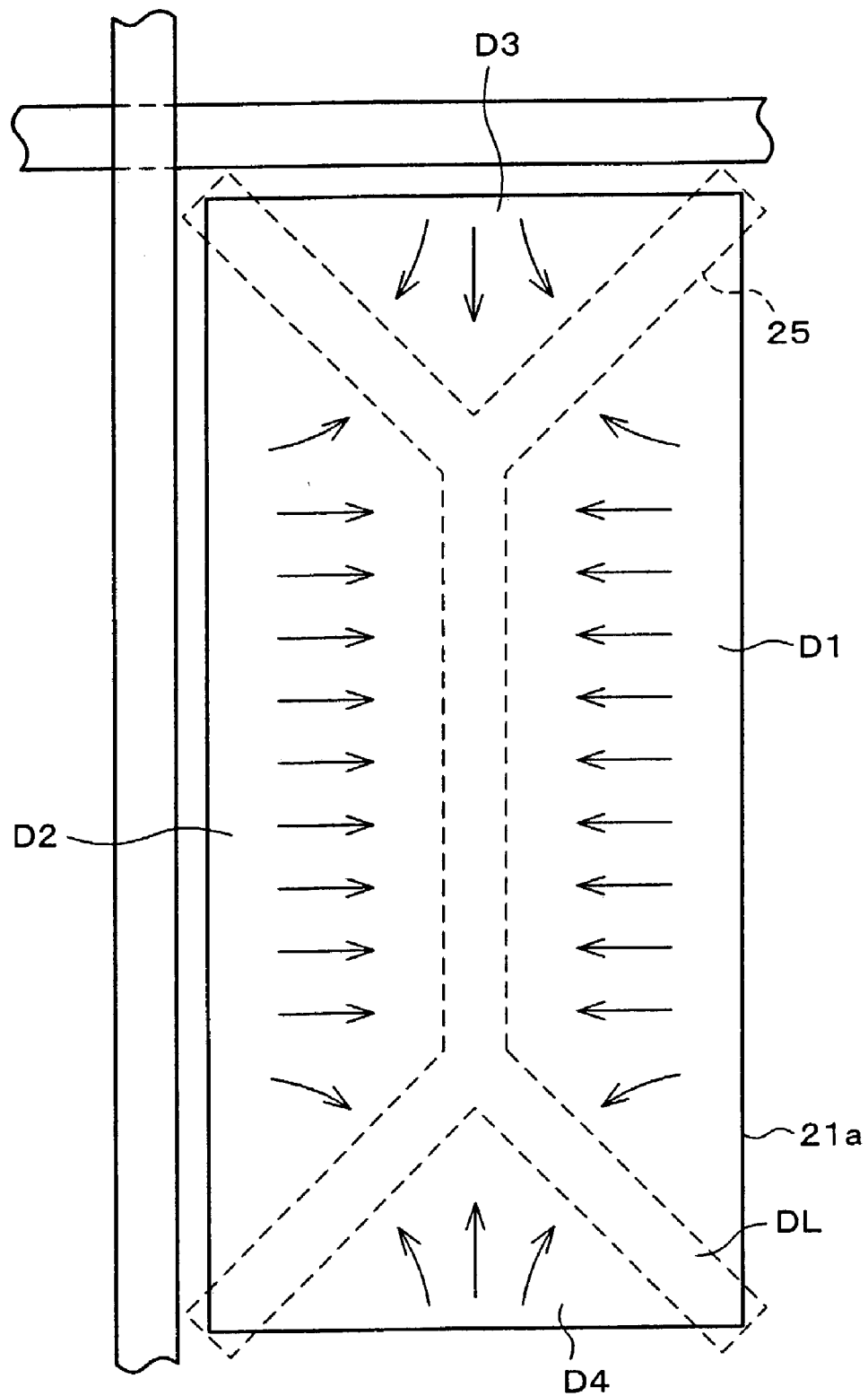
FIG. 10 is a plan view showing the vicinity of a pixel electrode in a liquid crystal cell in still another arrangement example of the foregoing liquid crystal display devices.

Further, a multi-domain vertical alignment can be also realized with the arrangement in which an orientation control window 25 where Y-shaped slits are connected symmetrically in the up-and-down direction (the in-plane direction that is parallel to any of the sides of the substantially square pixel electrode 21a) is provided on the counter electrode 21b of the counter substrate 11b, for example, as shown in FIG. 10.

When a voltage is applied, the foregoing arrangement does not produce enough electric field to tilt the liquid crystal molecules in the region right below the orientation control window 25, of the surface area of the counter substrate 11b, and the liquid crystal molecules are vertically oriented. On the other hand, in the region surrounding the orientation control window 25, of the surface area of the counter substrate 11b, as it goes close to the counter substrate 11b, an electric field spreads so as to escape from the orientation control window 25. Here, the long axes of the liquid crystal molecules tilt in the vertical direction to the electric field, and the in-plane component in the orientation direction of the liquid crystal molecules become substantially vertical to each side of the orientation control window 25, as indicated by arrows in FIG. 10. Therefore, also in this arrangement, the orientation direction of the liquid crystal molecules in the pixel can be divided into four directions, and it is possible to obtain the same effect as that of the liquid crystal cell 11 with the structure shown in FIGS. 2 though 4.

Further, explained in the above description is the case where the orientation direction is divided into four directions. The structure using a radial alignment liquid crystal cell 11, as shown in FIGS. 11 and 12, can also obtain the same effect.

Figure 11:
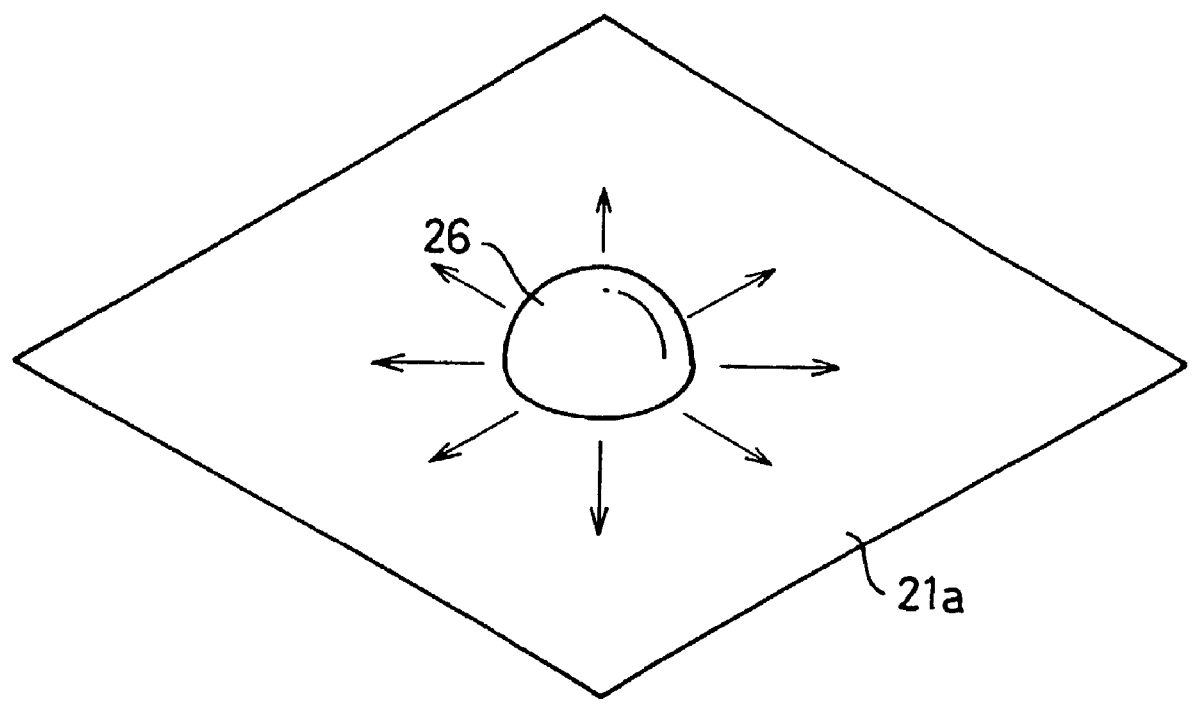
FIG. 11 is a perspective view showing a pixel electrode of a liquid crystal cell in yet another arrangement example of the foregoing liquid crystal display devices.

More specifically, in the structure shown in FIG. 11, instead of the protrusion 24 shown in FIG. 9, a substantially hemispherical protrusion 26 is provided. Also in this case, the liquid crystal molecules near the protrusion 26 are oriented so as to be vertical to the surface of the protrusion 26. In addition, when a voltage is applied, an electric field in the part of the protrusion 26 tilts in the parallel direction to the surface of the protrusion 26. From these results, the liquid crystal molecules, in tilting when a voltage is applied, tend to tilt in a radial pattern about the protrusion 26 in the in-plane direction, and the liquid crystal molecules in the liquid crystal cell 11 can tilt and orient in a radial pattern. Note that, the protrusion 26 can be formed in the same process as that of the protrusion 24. Further, as the protrusion 24, in the case where orientation control force is insufficient, it is desirable that a plurality of protrusions 26 are provided on each of the pixel electrodes 21a.

Figure 12:
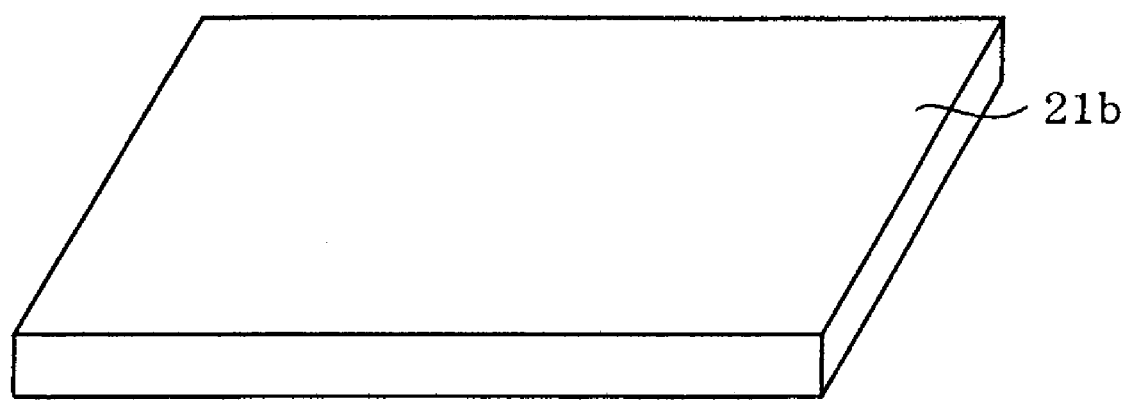
FIG. 12 is a perspective view showing a pixel electrode and a counter electrode of a liquid crystal cell in still another arrangement example of the foregoing liquid crystal display devices.
Figure 12:
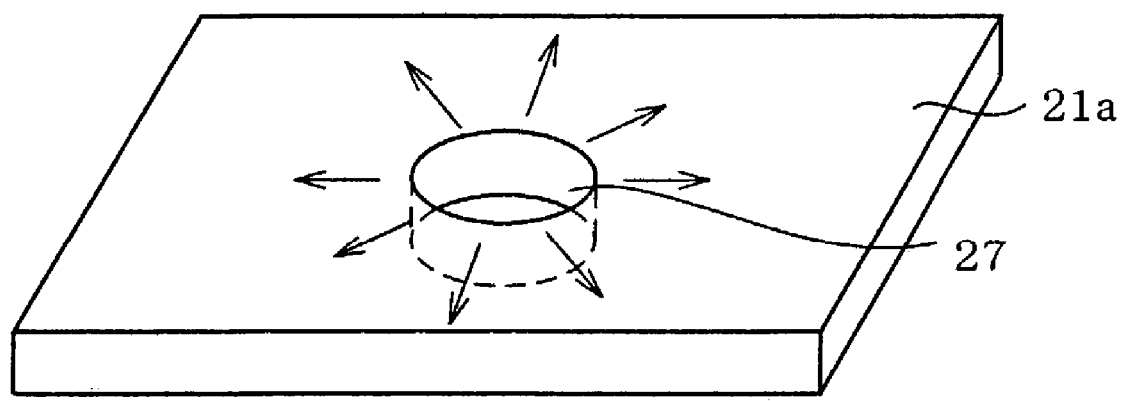
Figure 13:
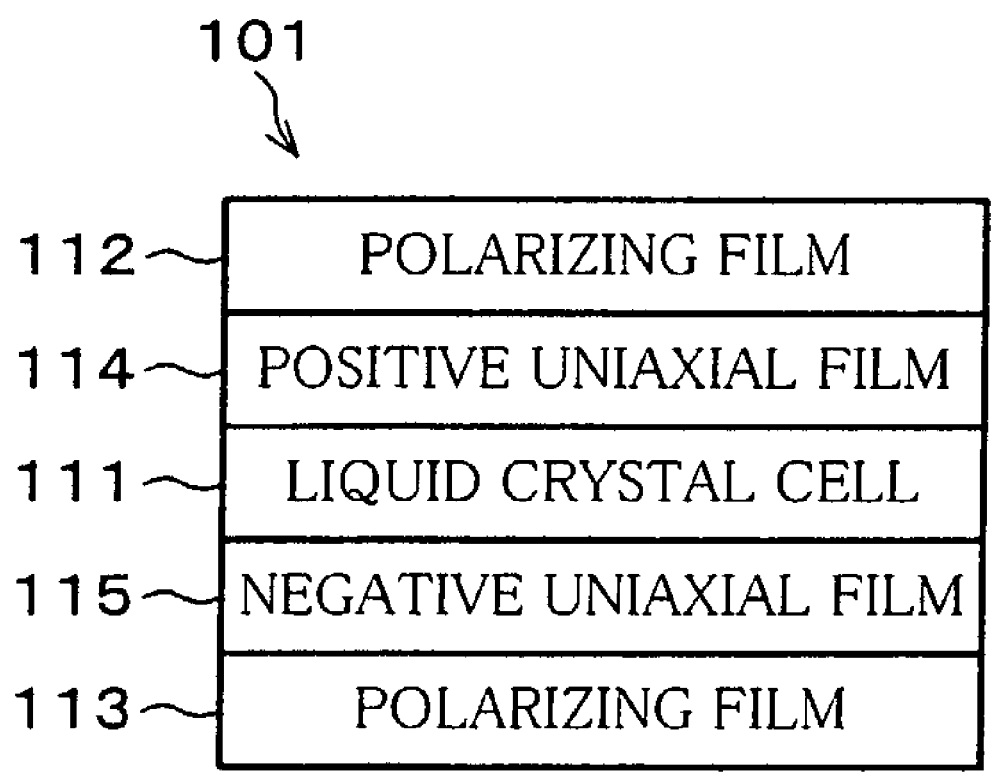
FIG. 13 is a schematic diagram showing the main arrangement of a liquid crystal display device with a conventional art.

In the structure shown in FIG. 12, instead of the protrusion 24 shown in FIG. 9, a circular slit 27 is provided to the pixel electrode 21a. When a voltage is applied, this arrangement does not produce enough electric field to tilt the liquid crystal molecules in the region right on the slit 27, of the surface of the pixel electrode 21a. Therefore, in this region, even when a voltage is applied, the liquid crystal molecules are oriented vertically. On the other hand, in the region near the slit 27, of the surface of the pixel electrode 21a, as it gets close to the slit 27 in the thickness direction, the electric field spreads obliquely so as to escape from the slit 27. Here, the long axes of the liquid crystal molecules tilt in the vertical direction. According to the continuity of liquid crystal, the liquid crystal molecules away from the slit 27 are also oriented in the same direction. Thus, when a voltage is applied to the pixel electrode 21a, the liquid crystal molecules can be oriented so that the in-plane components of the orientation direction spread in a radial pattern about the slit 27 as indicated by arrows in FIG. 12, that is, the liquid crystal molecules can be oriented symmetrically to the center of the slit 27. Here, since the tilt of the electric field varies depending on applied voltage, a substrate's normal direction component (tilt angle) in the orientation direction of the liquid crystal molecules can be controlled by applied voltage. Note that, since the increase in applied voltage increases a tilt angle to the substrate's normal direction, the liquid crystal molecules are oriented substantially in parallel with a display screen as well as in a radial pattern in a plane. Further, as the protrusion 26, in the case where orientation control force is insufficient, it is desirable that a plurality of slits 27 are provided on each of the pixel electrodes 21a.

Incidentally, explained in the above description is the case where the orientation direction of the liquid crystal molecules in the pixel is divided. However, a liquid crystal cell without orientation division (a mono-domain liquid crystal cell) can also obtain the same effect.

In this case, the pixel electrode 21a and the counter electrode 21b, which are not provided with the protrusions 23a and others, are formed evenly. In the mono-domain vertical alignment liquid crystal cell, unlike a multi-domain vertical alignment or radial tilt alignment liquid crystal cell, a rubbing process is included in the manufacturing process, and rubbing directions of the liquid crystal molecules in the liquid crystal layer 11c are set so as not to be parallel between the substrates 11a and 11b. The liquid crystal cell 11 and the polarizing plate 12 and 13 are disposed so that the rubbing direction forms an angle of 45 degrees with the absorption axes AA12 and AA13 of the respective polarizing plates 12 and 13. Also in this case, when no voltage is applied, the liquid crystal molecules in the pixel are oriented in the substrate's normal direction (in the vertical direction), as in the case of FIG. 2. Therefore, it is possible to obtain the same effect by using the same polarizing plates 12 and 13 and phase difference plates (14 and 15) as those in the above embodiment.

Incidentally, according to the liquid crystal display devices 1 and 1a shown in FIGS. 1 and 6, respectively, the optical properties of members disposed from the liquid crystal cell 11 to the polarizing plate 12 on one side are not equal to those of members disposed from the liquid crystal cell 11 to the polarizing plate 13 on the other side, so that there is the possibility that the contrast when the liquid crystal cell 11 is viewed from an azimuth on the left or right side may be different from that viewed from an azimuth on the upper or bottom side. Therefore, in the case where these liquid crystal display devices 1 and 1a requires the viewing angle property balanced in the left, right, upper, and bottom directions, it is desirable to use a liquid crystal cell in which the orientation direction of the liquid crystal molecules in each pixel is divided into four or more directions, such as four division alignment liquid crystal cells and radial alignment liquid crystal cells.

Further, as an example explained in the above description is the case where the liquid crystal cell 11 has the liquid crystal layer 11c with a negative dielectric anisotropy; however, the present invention is not limited to this. The liquid crystal cell 11 having the liquid crystal layer 11c with a positive dielectric anisotropy can also obtain the same effect, provided that the liquid crystal cell is the one in which the liquid crystal molecules are oriented vertically to the substrate of the liquid crystal cell 11 in black displaying, as the structure in FIG. 2.

In this case, an electric field is applied to the liquid crystal layer 11c in the parallel direction to substrates by using an electrode that produces an electric field in the parallel direction to substrates, as an electrode of a comblike structure which is used in the IPS (In-Plane Switching) mode. Also in this case, when no voltage is applied (when there is no electric field), the liquid crystal molecules in the pixel are oriented in the vertical direction to the substrates, as the structure in FIG. 2. Therefore, it is possible to obtain the same effect by using the same polarizing plates 12 and 13 and the phase difference plates (14 and 15) as those in the above embodiment.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A liquid crystal display device, comprising:
   a liquid crystal cell which is provided with two substrates to sandwich a liquid crystal and to cause liquid crystal molecules in the liquid crystal to orient substantially vertically to surfaces of the two substrates;
   first and second polarizing plates which are provided on two sides of the liquid crystal cell, respectively, so that absorption axes of the polarizing plates are orthogonal to each other;
   a first phase difference film, provided between the first polarizing plate and the liquid crystal cell, having a positive uniaxial anisotropy; and
   a second phase difference film, provided between the second polarizing plate and the liquid crystal cell, having a negative uniaxial anisotropy,
   the first and second polarizing plates being provided with respective base films, which are provided so that optical axes of the base films are substantially vertical to the substrates, each of the base films having a negative uniaxial anisotropy, the first phase difference film being provided so that a retardation axis of the first phase difference film is orthogonal to the absorption axis of the first polarizing plate, the second phase difference film being provided so that an optical axis of the second phase difference film is substantially vertical to the substrates, wherein:

when a parameter α [nm] relative to Rp is:

$\alpha = 135 - 0.7 \times Rtac$; and a parameter β [nm] relative to Rn is:

$\beta = Rlc - 65 - 1.4 \times Rtac$, where Rp [nm] is a retardation in an in-plane direction of the first phase difference film, Rn [nm] is a retardation in a thickness direction of the second phase difference film, Rtac [nm] is a retardation in a thickness direction of the base films, and Rlc [nm] is a retardation in a thickness direction of the liquid crystal, the retardation Rp is set to be not less than 80% nor more than 120% of the parameter α, and the retardation Rn is set to be not less than 60% nor more than 90% of the parameter β.

2. The liquid crystal display device according to claim 1, wherein:

the retardation Rp is set to be not less than 90% nor more than 110% of the parameter α, and the retardation Rn is set to be nor less than 65% nor more than 85% of the parameter β.

3. The liquid crystal display device according to claim 1, wherein the liquid crystal has a negative dielectric anisotropy.

4. The liquid crystal display device according to claim 1, wherein the liquid crystal cell is a multi-domain vertical alignment liquid crystal cell.

5. A liquid crystal display device, comprising:

a liquid crystal cell which is provided with two substrates to sandwich a liquid crystal and to cause liquid crystal molecules in the liquid crystal to orient substantially vertically to surfaces of the two substrates;

first and second polarizing plates which are provided on two sides of the liquid crystal cell, respectively, so that absorption axes of the polarizing plates are orthogonal to each other;

a first phase difference film, provided between the first polarizing plate and the liquid crystal cell, having a positive uniaxial anisotropy; and a second phase difference film, provided between the first phase difference film and the liquid crystal cell, having a negative uniaxial anisotropy, the first and second polarizing plates being provided with respective base films, which are provided so that optical axes of the base films are substantially vertical to the substrates, each of the base films having a negative uniaxial anisotropy, the first phase difference film being provided so that a retardation axis of the first phase difference film is orthogonal to the absorption axis of the first polarizing plate, the second phase difference film being provided so that an optical axis of the second phase difference film is substantially vertical to the substrates, wherein:

when a parameter α [nm] relative to Rp is:

$\alpha = 135 - 0.7 \times Rtac$; and a parameter β [nm] relative to Rn is:

$\beta = Rlc - 65 - 1.4 \times Rtac$, where Rp [nm] is a retardation in an in-plane direction of the first phase difference film, Rn [nm] is a retardation in a thickness direction of the second phase difference film, Rtac [nm] is a retardation in a thickness direction of the base films, and Rlc [nm] is a retardation in a thickness direction of the liquid crystal, the retardation Rp is set to be not less than 80% nor more than 120% of the parameter α, and the retardation Rn is set to be not less than 60% nor more than 90% of the parameter β.

6. The liquid crystal display device according to claim 5, wherein:

the retardation Rp is set to be not less than 90% nor more than 110% of the parameter α, and the retardation Rn is set to be not less than 65% nor more than 85% of the parameter β.

7. The liquid crystal display device according to claim 5, wherein the liquid crystal has a negative dielectric anisotropy.

8. The liquid crystal display device according to claim 5, wherein the liquid crystal cell is a multi-domain vertical alignment liquid crystal cell.

9. The liquid crystal display device according to claim 1, wherein:

the retardation Rp is set to be in the range from 80% to 120% of the parameter α, and the retardation Rn is set to be in the range from 85% to 90% of the parameter β.

10. The liquid crystal display device according to claim 5, wherein:

the retardation Rp is set to be in the range from 80% to 120% of the parameter α, and the retardation Rn is set to be in the range from 85% to 90% of the parameter β.

* * * * *